(12) United States Patent
Lee et al.

(10) Patent No.: US 8,007,628 B2
(45) Date of Patent: Aug. 30, 2011

(54) CELLULAR COMPOSITE GRID-STIFFENED STRUCTURE

(75) Inventors: Shin S. Lee, Bellevue, WA (US); Barry P. VanWest, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 286 days.

(21) Appl. No.: 12/252,036

(22) Filed: Oct. 15, 2008

(65) Prior Publication Data

US 2009/0038744 A1 Feb. 12, 2009

Related U.S. Application Data

(62) Division of application No. 11/048,177, filed on Feb. 1, 2005, now Pat. No. 7,510,757.

(51) Int. Cl.
  *B32B 37/00* (2006.01)
  *B29C 65/00* (2006.01)
(52) U.S. Cl. .................................. 156/307.1; 156/227
(58) Field of Classification Search .................. 156/216, 156/227, 307.1, 307.3, 307.5, 307.7
See application file for complete search history.

(56) References Cited

U.S. PATENT DOCUMENTS

| 4,566,231 A | 1/1986 | Konsevich |
| 6,007,894 A | 12/1999 | Barnes et al. |

OTHER PUBLICATIONS

Boeing Presentation Document, Nov. 22, 2004 (5 pgs), Existing Grid Stiffened Structures, Grid Stiffened Structure Fabrication, Minotaur Payload Fairing, Russian Lattice Composite Technology, Prototype Composite Fuselage Panel of Airbus Passenger Aircraft A320.

*Primary Examiner* — John L Goff, II
(74) *Attorney, Agent, or Firm* — Harness, Dickey & Pierce, P.L.C.

(57) ABSTRACT

A cellular composite structure includes a grid having groups of angularly intersecting ribs. The ribs of each group are oriented substantially in the same direction to each other and angularly oriented from the other rib groups. An additional rib defines a composite structure outer perimeter wall and can be differently angularly oriented from the other ribs. A contiguous rib wall is created by segments of ribs defined by rib intersections. The contiguous rib wall bounds a cavity. A multilayer sheet cap member with extending walls to engage the contiguous rib wall is positioned within the cavity. The engagement walls extend from individual sheet perimeter portions angularly oriented to the sheet. The ribs and cap member have pre-impregnated resin. Heating the cap member and ribs activates the resin and co-cures the composite structure.

18 Claims, 8 Drawing Sheets

CELLULAR COMPOSITE GRID-STIFFENED STRUCTURE

CROSS-REFERENCE TO RELATED APPLICATIONS

This application is a divisional of U.S. patent application Ser. No. 11/048,177 filed on Feb. 1, 2005 now U.S. Pat. No. 7,510,757. The entire disclosure of the above application is incorporated herein by reference.

FIELD OF THE INVENTION

The present invention relates in general to grid structures and more specifically to a composite material grid-stiffened structure and method of manufacture.

BACKGROUND OF THE INVENTION

Metallic grid-stiffened structures have been used in aerospace and other industry applications due to their structural efficiency as stiffened panels, shells and tanks. Composite grid-stiffened structures provide a better strength-to-weight ratio for these applications resulting in lower weight and increased payload capacity. Composite grid-stiffened structures also provide an alternative to honeycomb-core structures. Grid stiffened structures have no moisture entrapment problems and require no core forming, placement and/or potting.

Current methods to fabricate composite grid-stiffened structures often have resin layers between each grid stiffener and the attached skin. Current fabrication methods utilize filament winding or fiber placement to lay down tow for both the stiffeners and skin, the advantage being that a single, integrated co-cured structure can be fabricated using automated machinery. However, this results in a laminate skin that is joined to the stiffeners with only the layer of resin forming the bond line and with no fibers crossing the bond-line.

Grid stiffeners commonly have unidirectional fiber placement. The resulting stiffener is strongest in the directions parallel to the stiffener axis and weakest in the directions transverse to its axis, because all the fibers are generally positioned parallel to the stiffener axis. Transverse stiffener strength is therefore a structural limitation. Further, if disbonding occurs anywhere in the stiffener/skin bond line, the disbanding can propagate throughout the structure unimpeded. The bond between the stiffeners and the body skin is not maximized because of the lack of interweaving between the skin and the parallel positioned stiffener fibers. Current composite grid-stiffened structures having only a layer of resin between the stiffeners and skin are therefore best suited for expendable structures, such as rocket launchers, and not for structures which require long life and damage resistance such as aircraft and similar vehicles.

SUMMARY OF THE INVENTION

According to one preferred embodiment, a cellular composite grid-stiffened structure of the present invention provides a grid including a plurality of intersecting ribs arranged in a plurality of rib groups. The ribs of each group are oriented in a non-crossing pattern with respect to each other and are angularly oriented with respect to the ribs of the other groups. A plurality of rib intersections define a plurality of rib segments. A plurality of contiguous rib walls are each configured as a closed geometric shape. Each of the contiguous rib walls include a selected group of the rib segments sharing selected ones of the rib intersections to define the closed geometric shape. Each of the contiguous walls define one of a plurality of composite structure cavities. A plurality of cap members are each slidably receivable within a selected one of the cavities and each is bondable to a substantial portion of a length of the contiguous rib wall defining the selected one of the cavities. Each of the cap members is created from multiple material layers bonded together.

According to another preferred embodiment for a cellular composite structure of the present invention, the structure includes a plurality of first ribs substantially oriented in a first direction. A plurality of second ribs are substantially oriented in a second direction and are angularly disposed with respect to the plurality of first ribs. Each of the plurality of second ribs intersect at least one of the plurality of first ribs. A plurality of third ribs are substantially oriented in a third direction and are disposed angularly different with respect to each of the first and second ribs. Each of the plurality of third ribs intersect at least one of the plurality of first ribs and at least one of the plurality of second ribs. A plurality of contiguous walls are each defined by the intersection of one each of the first, second and third ribs. Each contiguous wall defines and bounds one of a plurality of cavities. A plurality of cap members are each slidably receivable within a selected one of the cavities and are shaped to engage a substantial length of the contiguous wall of the selected cavity. Each cap member includes a multilayer cap sheet shaped to substantially match a shape of the contiguous wall of the selected cavity. A plurality of engagement walls each extend from a perimeter portion of the cap sheet and are angularly oriented with respect to the cap sheet. The engagement walls bond with substantially all of the contiguous wall of the selected cavity.

According to still another preferred embodiment of the present invention, a method is provided for creating a cellular composite structure. The composite structure includes a plurality of intersecting ribs. Portions of the intersecting ribs create a plurality of contiguous walls each defining a cavity. The method includes shaping a sheet having bondable layers of resin pre-impregnated cloth to substantially match an inner perimeter of one of the contiguous walls. The method further includes bending a freely extending portion of each of the cloth layers to create a plurality of walls about a perimeter of the sheet. Still further, the method includes positioning the sheet within one of the cavities having each of the walls of the sheet in contact with the contiguous wall. The method also includes heating the sheet and grid structure to adhesively bond each of the bondable layers to each other and each of the walls to the contiguous wall.

Cellular composite structures according to the present invention provide several advantages. By providing separate cap members having multiple layers of material to create each of the associated riser walls bondable to individual intersecting ribs, structural integrity of the cellular composite structure is increased. When the cap members are thermally bonded to the intersecting ribs of the grid, a close dimensional fit of the cap members ensures that the flow of resin leaves few or no gaps where a crack can initiate and propagate from.

The features, functions, and advantages can be achieved independently in various embodiments of the present invention or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
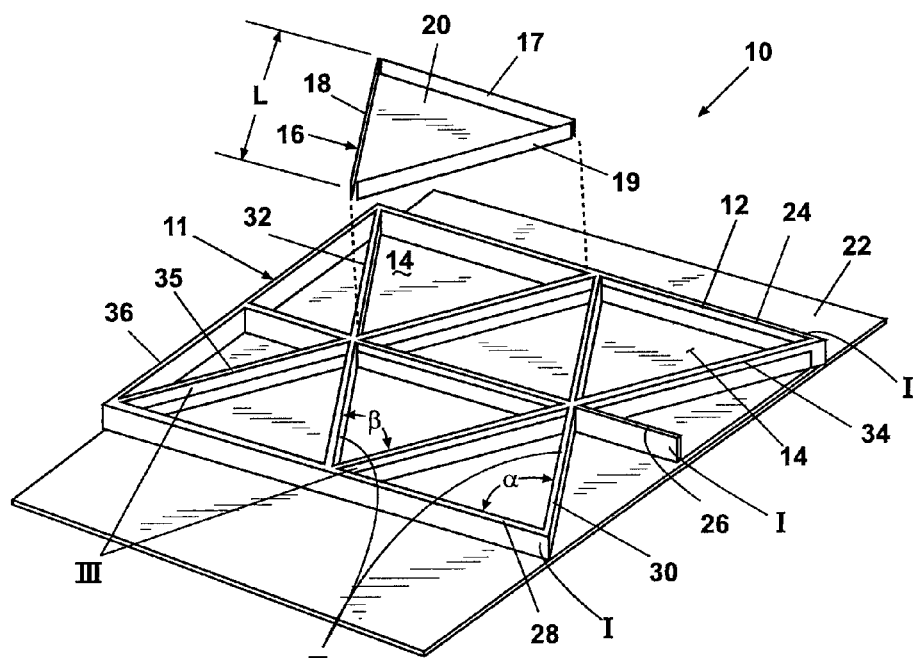
FIG. 1 is a perspective view of one embodiment of a cellular composite structure according to the present invention.

According to a preferred embodiment of the present invention and referring generally to FIG. 1, a cellular composite structure 10 of the present invention includes a grid 11 having a plurality of intersecting ribs 12. Between the intersecting ribs 12 a plurality of apertures or cavities 14 are created. The cavities 14 have a closed geometric shape shown as a regular triangular shape, however, the invention is not limited to triangular shaped cavities. Other shapes including but not limited to rectangles, squares diamonds, parallelograms, hexagons and the like can also be used. Similarly shaped aircraft structural members are disclosed in U.S. patent application Ser. No. 10/846,861, filed May 14, 2004, the disclosure of which is incorporated herein by reference. Generally, the cavities 14 are designed to have the same shape, i.e., a triangle of a common size. Some modification of cavity shape can occur where specific tailoring for load paths or cutouts in the structure are required. Each cavity 14 receives a composite cap member 16 made from fiber reinforced resin and having a first, second and third engagement or riser wall 17, 18, and 19 along all edges. The riser walls contact the corresponding rib segments which bound cavity 14 and define a perimeter of cavity 14. The riser walls cure, co-cure and/or adhesively bond to the intersecting ribs 12 during final processing of cellular composite structure 10.

In one embodiment, each of the riser walls 17, 18, 19 are oriented substantially perpendicular to a cap sheet or end wall 20. Cap end wall 20 is formed from a plurality of layers of material. Each layer integrally provides one of the riser walls 17, 18, 19 respectively. A length "L" of each riser wall 17, 18, 19 can vary depending upon the geometric shape of the cavity 14 and spacing between intersecting ribs 12. In another aspect (not shown) the riser walls of the cap members can be non-perpendicularly oriented with respect to end wall 20.

A unitary sheet 22, provided for example of a resin pre-impregnated cloth material or fiber/polymeric sheet can optionally be bonded to end faces of the grid 11 as well as each of the cap end walls 20. The purpose of unitary sheet 22 is to provide a smooth, continuous outer surface for cellular composite structure 10. If unitary sheet 22 is not used, cellular composite structure 10 has an outer facing wall which is substantially created by each of the plurality of cap end walls 20.

For the exemplary triangular-shaped configuration, grid 11 includes a plurality of ribs including a first rib 24, a second rib 26, and a third rib 28 which together form a rib group I. A first cross rib 30 and a second cross rib 32 form a rib group II. A first alternating cross rib 34 and a second alternating cross rib 35 form a rib group III. Each of the ribs of each individual group are oriented in substantially the same direction with respect to each other and each of the ribs of each rib group are angularly oriented (oriented in a different direction or at a different angle) with respect to the ribs of the other rib groups. Cellular composite structure 10 can also be provided with one or more perimeter wall ribs 36. Perimeter wall ribs 36 (only one of which is shown for clarity) is angularly oriented (oriented in a different direction or at a different angle) with respect to any of the ribs of rib groups I, II or III.

In the embodiment shown, an included angle $\alpha$ is provided between the ribs of rib group I and the ribs of rib group II. An included angle $\beta$ is provided between ribs of rib groups II and III.

Figure 2:
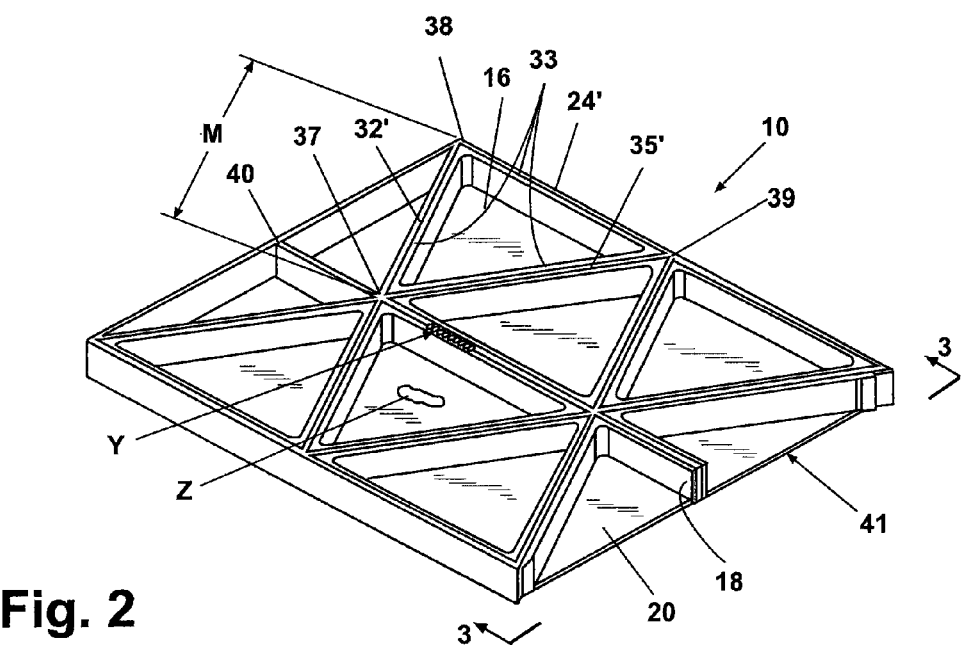
FIG. 2 is a perspective view similar to FIG. 1.

As best seen in reference to FIG. 2, a plurality of cap members 16 are shown after installation within the plurality of cavities 14 and thermal bonding to riser walls 17, 18 and 19. In one preferred embodiment of the invention, each of the ribs 12 is formed from unidirectional tows and each of the cap members 16 are formed from one or more layers of a cloth material, each of the tows and the cloth layers pre-impregnated with a resin which when activated acts as an adhesive. In one aspect, the material of ribs 12 is a graphite/polymeric material combination having multiple tows of fibers running parallel to one another in a direction of a rib length. In this aspect of the invention, the material of cap members 16 is also a graphite/polymeric material combination formed as multiple layers of cloth material, each cloth layer having a plurality of graphite/polymeric material fibers running in substantially perpendicular directions. To maximize the strength and tear resistance of cellular composite structure 10, the orientation of the fibers of each cloth layer of cap members 16 are angularly offset from each other when the individual layers are stacked. Other materials can be used in place of graphite, including but not limited to fiberglass or KEVLAR®. The materials are preferably pre-impregnated with a resin such as an epoxy.

A plurality of rib intersections are created by the plurality of intersecting ribs 12. For example, rib intersections 37, 38 and 39 define a triangular shape for cavity 14 and cap member 16. Rib intersection 37 divides second cross rib 32 into two or more rib segments including a rib segment 32'. Similarly, rib intersection 37 divides second alternating cross rib 35 into two or more rib segments including rib segment 35'. Rib intersection 39 divides first rib 24 into two or more rib segments including rib segment 24'. A plurality of contiguous walls are created by selected rib segments. For example, a contiguous wall 33 is created by each of rib segments 24', 32' and 35', respectively. Each riser wall 17, 18 and 19 of cap member 16 contacts a corresponding rib segment 24', 32' or 35', when cap member 16 is inserted or seated in cavity 14. A plurality of similar cap members 16 are similarly disposed in each of the other cavities 14 of cellular composite structure 10. The shape of each cap member 16 is defined by the selected group of rib segments and rib intersections for the other cavities 14. The cap members 16 generally have a similar or equal outer perimeter and shape. An exception to this are cap members disposed in cavities adjacent to the perimeter wall ribs 36. For example rib intersections 37, 38 and 40 define a different triangular-shape of an outer located cavity 14 than the interior located cavities 14.

The riser wall lengths "L" (identified for second riser wall 18 in FIG. 1) are shorter than a rib segment length "M" of the rib segments (for example, rib segment 32'). This permits seating the cap members 16 within each cavity 14. A total contiguous wall length of contiguous wall 33 is the sum of each group of contiguous rib segment lengths, for example the lengths of rib segments 24', 32' and 35', respectively. The riser wall length "L" for each riser wall of a cap member 16 is shorter than rib segment length "M", but for bonding purposes is closely matched to each rib segment length "M". Therefore, the riser walls of each of the cap members 16 are bonded to a maximum length of each contiguous wall. This provides maximum structural integrity for cellular composite structure 10. After assembly of cellular composite structure 10, and if unitary sheet 22 is not used, a structure outer face 41 including each of the cap end walls 20 of the cap members 16 provides an outer face for cellular composite structure 10.

Figure 3:
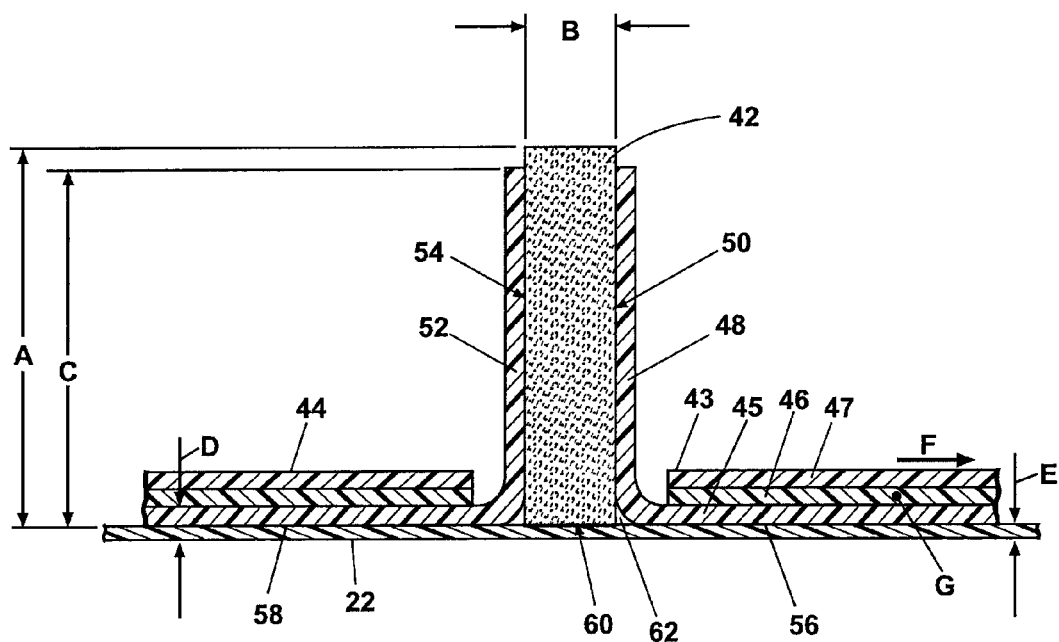
FIG. 3 is a partial cross-sectional elevational view taken at Section 3 of FIG. 2.

Referring next to FIG. 3, a partial cross sectional view through an exemplary rib 42 and two cap members identifies the plurality of layers of material used to construct each cap member and each rib. A first cap member 43 and a second cap member 44 are disposed on opposite sides of rib 42. First cap member 43 includes first, second and third layers 45, 46, and 47 of a resin pre-impregnated cloth material. An integral extension of first layer 45 provides riser wall 48 which is bondable to a first side 50 of rib 42. Similarly, a riser wall 52 of second cap member 44 is provided from a first layer of material and bondable to a second side 54 of rib 42. The total number of layers of each of first and second cap members 43, 44 create end walls 56 and 58. The other risers (not shown in this view) for each of first and second cap members 43, 44 are integrally provided by one of the remaining layers of cap members 43, 44.

Rib 42 includes a stiffener end face 60. The end walls 56, 58 are substantially parallel to stiffener end face 60 in this embodiment. For alternate embodiments, where cellular composite structure 10 is required to form a non-linear surface, for example the curving wall of a tank, end walls 56, 58 can be formed in a necessary shape to support the geometric shape of cellular composite structure 10 and may not be parallel to end face 60.

As further shown in FIG. 3, rib 42 includes a stiffener height "A" and a stiffener thickness "B". In one embodiment, stiffener height "A" is approximately 1.9 cm (0.75 in) and stiffener thickness "B" is approximately 0.51 cm (0.2 inches). A riser height "C" for each of the riser walls 48, 52 in a preferred embodiment of the present invention is substantially equal to stiffener height "A". In still other embodiments of the present invention riser height "C" is a predetermined percentage of stiffener height "A". A plurality of gaps 62 can result from localized bending of the riser walls of each cap member adjacent to a rib prior to bonding. Gaps 62 can be minimized by resultant resin flow when cap members 16 and grid 11 are heated to activate the pre-impregnated resin. A wall thickness "D" of each layer of cap members 16 is approximately 0.178 mm (0.007 in) in a preferred embodiment of the present invention. Wall thickness "D" can vary at the discretion of the designer. Similarly, a sheet thickness "E" of unitary sheet 22 is also approximately 0.178 mm (0.007 in) but can also vary at the discretion of the designer.

The quantity of individual layers used to construct the cap members can vary depending upon the shape and therefore the number of riser walls required. Additional layers (not shown) can also be added to cap members 16 to provide additional strength and/or stiffness. Each of the material layers of cap member 16 include fibers (not visible in these views) which are generally cross-oriented in a 0/90° configuration. It is desirable that the direction of the fibers of each successive layer be oriented differently as the layers are stacked, such as 45/135° in the second layer and so forth. As an example, a fiber orientation direction "F" is shown for third layer 47 and a fiber orientation direction "G" is shown for second layer 46. Fiber orientation "F" is to the right as viewed in FIG. 3 and fiber orientation direction "G" is angled toward/away from the viewer as shown in FIG. 3. All fiber orientations in rib 42 are directed toward/away from the viewer in FIG. 3.

Referring to both FIGS. 1 and 4, an exemplary method to construct a cellular composite structure 10 of the present invention is as follows. The ribs 12 forming grid 11 are first constructed, but are not heated or "cured". The individual lengths of the rib segments between rib intersections forming each of the contiguous walls 33 are predetermined by calculation. The length "L" of each of the riser walls of the cap members 16 is then determined based on the calculated rib segment lengths to permit a sliding or clearance fit of the cap members 16 within each cavity 14. A total length "T" in an equation: $T=(n \times L)$ provides the total perimeter length of each cap member 16, where "n" equals the quantity of rib segments defining a cavity 14.

Figure 4:
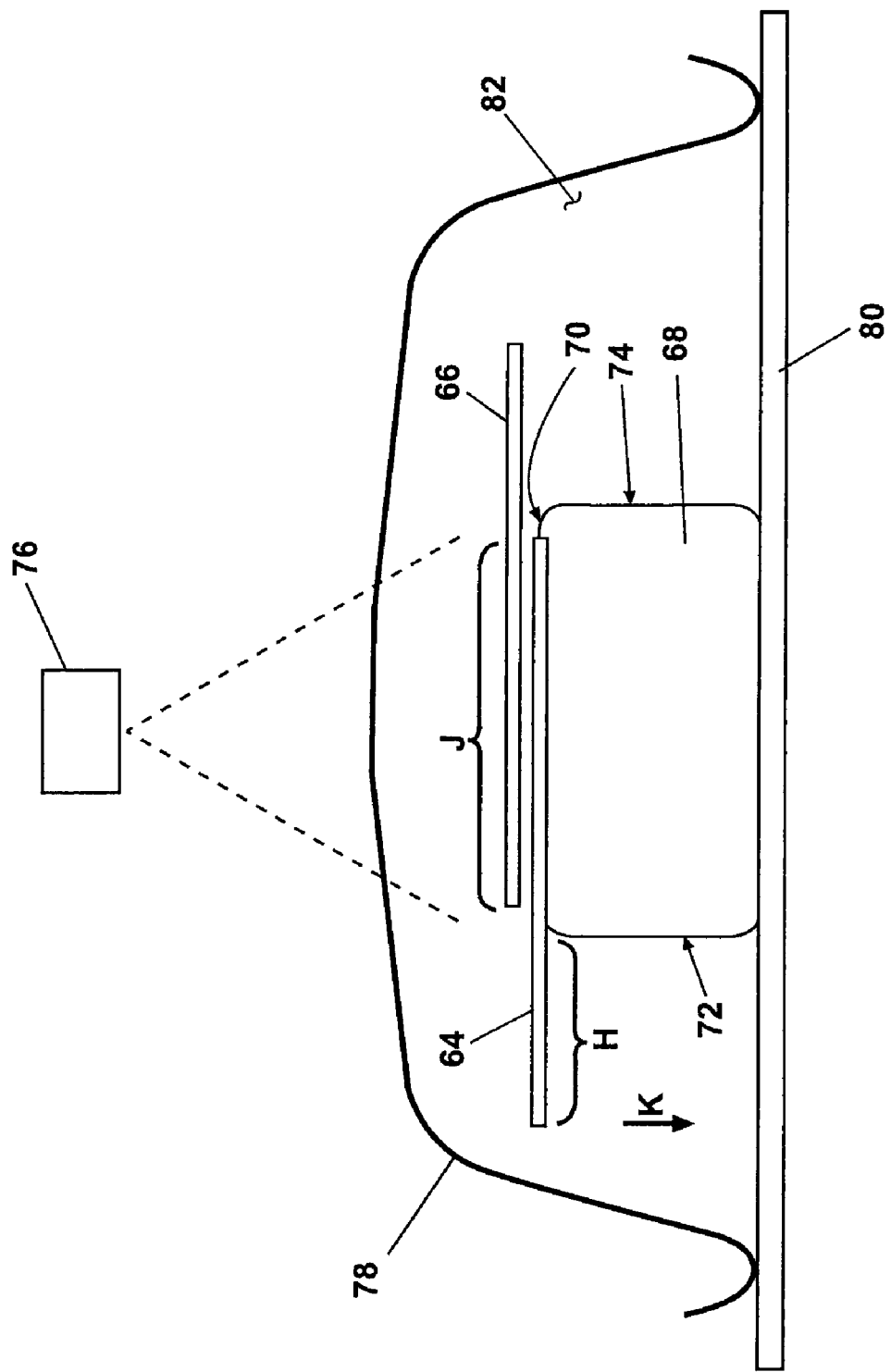
FIG. 4 is an end elevational view showing the assembly of multiple layers of material about an elastomeric tool of the present invention.

FIG. 4 identifies an exemplary first and second layer 64, 66 for a cap member 16 prior to bending about a tool 68. According to one preferred embodiment of the present invention, tool 68 is made from an elastomeric material including but not limited to rubber, neoprene or silicon rubber. The elastomeric material selected should be compatible with the temperature (approximately 250 to 350° F.) used to activate the resin to adhesively bond the material layers. The elastomeric material selected for tool 68 should also include a higher coefficient of thermal expansion than the materials for the ribs 12 and cap members 16. Tool 68 can include radius corners such as a radial corner 70 which permit the layers of material to smoothly bend when forming the riser walls.

As further shown in FIG. 4, first layer 64 is applied to a face of tool 68 such that an overhang area "H" representing a riser wall is provided. Second layer 66 is then positioned over first layer 64 to form a layer overlap region "J". Second layer 66 is also provided with a similar overhang area "H". A third or more layers (not shown for clarity) can also be used. The layers in the overhang areas "H" are bent about tool 68 until in this example, the overhang area "H" of first layer 64 contacts a tool face 72 and the overhang area "H" of second layer 66 similarly contacts a tool face 74. Each of the layers of material can be pre-aligned using an optical alignment system 76 to provide a proper overhang dimension.

According to one preferred method, a vacuum enclosure 78 is provided to assist in bending the riser wall portions of each of first and second layers 64, 66. Vacuum enclosure 78 is sealed to a work surface 80 upon which tool 68 is positioned. Vacuum equipment (not shown) is used to draw a partial vacuum within a cavity 82 such that vacuum enclosure 78 bends each of first and second layers 64, 66 about tool 68 and conforms the layers to the shape of tool 68. Each of the overhang areas "H" is therefore bent in a bending direction "K" by vacuum enclosure 78. The invention is not limited to the use of vacuum enclosure 78. Alternate methods to bend the riser walls of the cap members 16 of the present invention can also be used such as manual bending and bending in a form.

Figure 5:
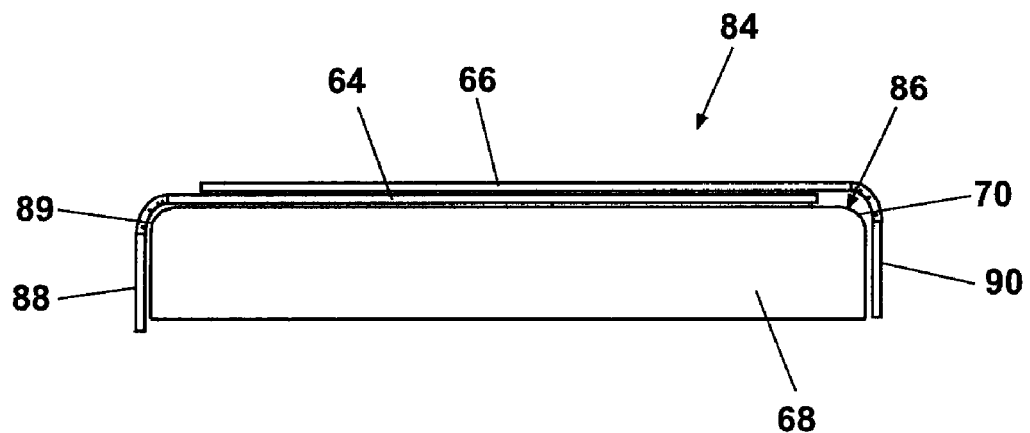
FIG. 5 is an end elevational view similar to FIG. 4 showing the layers of material following bending about the elastomeric tool.

As best seen in reference to FIG. 5, a tool/material layer assembly 84 includes each of first and second layers 64, 66 (additional layers as may be required are not shown for clarity) and tool 68. First and second layers 64, 66 are each disposed on a mounting surface 86 and bent about each of a radial corner 89 and radial corner 70, respectively to form each of a riser wall 88 and a riser wall 90, respectively. If the riser walls are formed by a single layer of material, expansion of tool 68 could be restricted on all sides of tool 68. Therefore, only one edge of each layer 64, 66 has a riser 88, 90, respectively, to allow for expansion of the elastomeric material of tool 68 during the curing process. Flow of the resin pre-impregnated in the layers during the curing process substantially fills any gaps.

Figure 6:
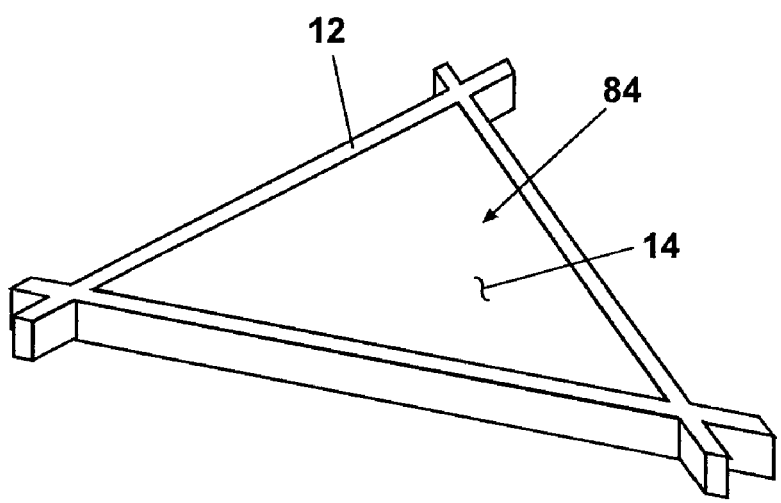
FIG. 6 is a perspective view showing an individual cavity formed by intersecting ribs of the present invention having an installed elastomeric tool and a cap member of the present invention.

Referring now to FIG. 6, tool/material layer assembly 84 is then inserted into one of the cavities 14 formed by intersecting ribs 12 of grid 11. To complete the subassembly of cellular composite structure 10, a plurality of tool/material layer assemblies 84 are similarly created and inserted into each of the cavities 14.

Figure 7:
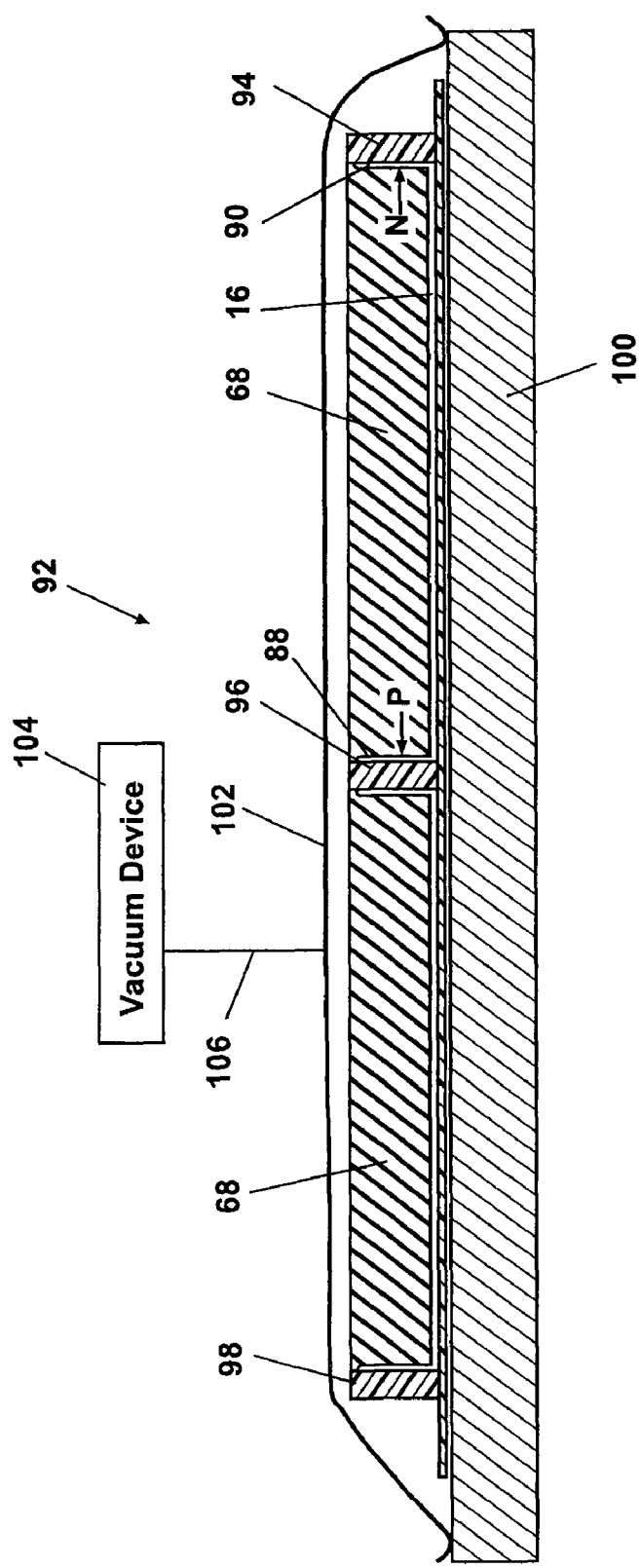
FIG. 7 is an end elevational view showing the assembly of components for vacuum forming and heat treatment of the composite structure of the present invention.

Referring now to FIG. 7, after each of the cavities 14 of cellular composite structure 10 have been filled by the plurality of tool/material layer assemblies 84, a working assembly 92 is created. Working assembly 92 in the example shown includes a rib 94, a rib 96 and a rib 98. Between each adjacent pair of ribs 94/96 and 96/98 are disposed one of the tool/material layer assemblies 84 each having one each of tool 68 and cap member 16 which in the exemplary embodiment shown also provides each of riser walls 88, 90. Working assembly 92 is positioned over a temporary mounting tool 100. In the embodiment shown, temporary mounting tool 100 forms a generally horizontal support surface, however, as previously noted the shape of temporary mounting tool 100 can also be configured to accommodate the desired geometric shape for cellular composite structure 10. A vacuum enclosure 102 is then positioned over working assembly 92 and sealed against temporary mounting tool 100. Using a vacuum device 104, via a vacuum line 106 a partial vacuum is drawn within vacuum enclosure 102 to hold all of the component parts of working assembly 92 tightly together. Working assembly 92 with temporary mounting tool 100 is then positioned in an autoclave and heated to the resin activation temperature (approximately 250 to 350° F.) which activates the resin pre-impregnated in the material of the various ribs and cap members, co-curing the ribs and the cap members. After a retention period (approximately one to two hours) the resin in each of the parts has been activated and adhesively bonds the various cap members to each of the ribs.

During the heating process, the elastomeric material of tools 68 thermally expands outwardly in each of the force directions identified by arrows "N" and "P" to force the various riser walls into contact with the associated ribs. The use of an elastomeric material of a silicon or RTV type rubber such as AIRCAST 3700, made by AirTech International, Incorporated of Huntington Beach, Calif. for tools 68 provides a coefficient of thermal expansion which is greater than the coefficient of thermal expansion of the materials used for the cap members and ribs and is acceptable for use at approximately 350° F. temperatures. Within the autoclave, a pressure is applied to the outside of the vacuum enclosure 102, such as from a pressurized nitrogen gas, to evenly distribute the resin. After the retention period within the autoclave, working assembly 92 is removed and allowed to cool to harden the resin. A total cycle time to heat up the assembly, soak at temperature and cool down can require about 12 to 24 hours. When cooled, the tools 68 contract and are removed. Following removal of tools 68, a configuration similar to FIG. 2 results.

If a unitary sheet 22 (shown in FIG. 1) is desired, it is incorporated with working assembly 92 prior to insertion in the autoclave. In another preferred embodiment (not shown), tool/material layer assemblies 84 are inserted into cavities 14 such that cap members 16, and optional unitary sheet 22 are above tools 68. For applications requiring a high degree of surface smoothness, such as the aerodynamic smoothness necessary for exterior surfaces of an aircraft, flatness controlled and/or curvature controlled caul plates having a machined or formed surface finish can be placed between vacuum enclosure 102 and working assembly 92 to provide the necessary surface finish for working assembly 92. This embodiment allows, for example, a male curved tool 100 to be used to fabricate a part with an external skin.

Figure 8:
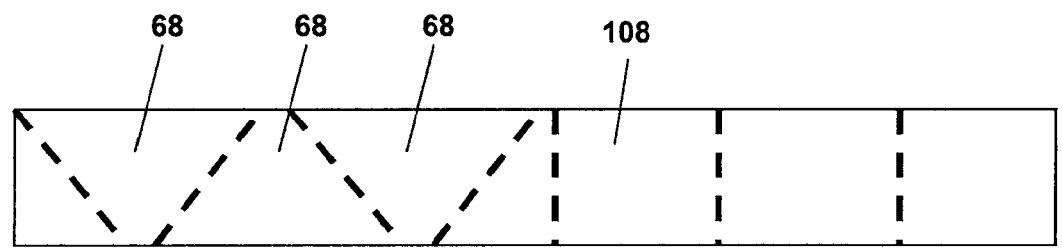
FIG. 8 is a plan view of a material block identifying an exemplary cut-out pattern for a plurality of elastomeric tools of the present invention.

As best seen in reference to FIG. 8, each of the tools 68 can be cut from a pre-cast block 108 of elastomeric material as shown. A process such as water lancing can be used to cut each tool 68 from block 108. As will be obvious, any desired shape for tool 68 can be cut from block 108 which permits any desired shape of any cavity 14 to be filled using a tool 68.

Figure 9:
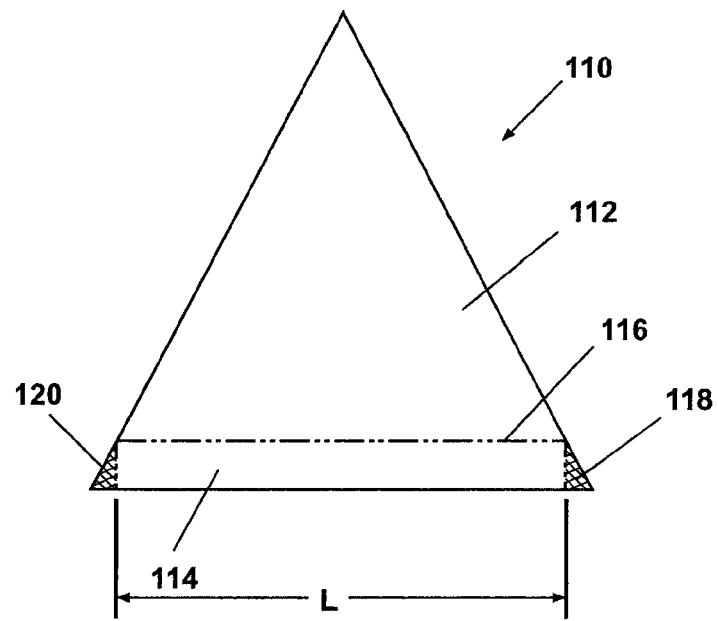
FIG. 9 is a plan view of an individual pre-impregnated cloth layer for a cap member of the present invention.

Referring now to FIG. 9, a triangular-shaped individual end wall layer 110 of a cap member 16 is shown, similar to first and second layers 64, 66. End wall layer 110 includes a first bondable area 112 corresponding to layer overlap region "J" shown in FIG. 4. A second bondable area 114 corresponding to a riser wall is delineated from first bondable area 112 by a reference bend line 116. After removal of each of a waste area 118 and a waste area 120 the desired riser wall length "L" is provided. A plurality of end wall layers 110 can be cut from a single larger piece of material. Two or more end wall layers 110 are then used to construct each of the cap members 16. As previously noted herein, each second bondable area 114 which corresponds to a single riser wall is integrally provided by only one layer of material to construct each cap member 16. The reference bend lines of each end wall layer are aligned with the radius corners of tool 68 for bending.

Figure 10:
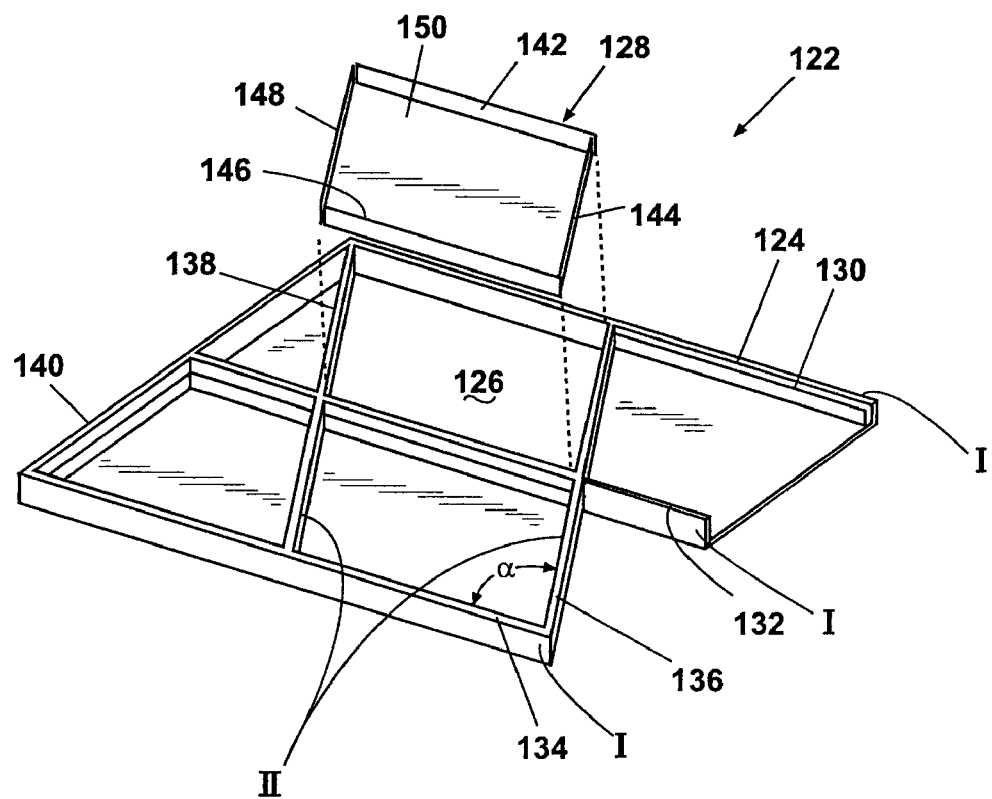
FIG. 10 is a perspective view similar to FIG. 2, showing another preferred embodiment of a cellular composite structure according to the present invention.

Referring now to FIG. 10, a cellular composite structure 122 according to another preferred embodiment of the present invention includes a grid 124 having a plurality of intersecting ribs which create a plurality of cavities 126. Cellular composite structure 122 provides for generally rectangular or parallelogram shaped cap members 128 in addition to other geometric shapes as shown. Grid 124 includes first, second and third ribs 130, 132, 134 respectively. First and second cross ribs 136, 138 are oriented at angle a from each of the first, second and third ribs, 130, 132, 134. At least one perimeter wall rib 140 is also provided similar to perimeter wall rib 36. The rectangular shaped cap member 128 includes first, second, third and fourth riser walls 142, 144, 146, 148, respectively. Each of the riser walls 142, 144, 146, 148 are integrally included with an individual material layer used to form a cap end wall 150.

Referring back to FIG. 2, a crack "Y" which forms between a riser wall of the present invention and one of the ribs is isolated to the particular rib segment where the crack forms because of the individual bond length of the associated riser wall and is therefore restricted from propagating beyond the individual rib segment. Similarly, a hole or defect "Z" occurring in a cap end wall of the present invention is also limited in propagation both by the different fiber orientation directions of adjoining layers of material within the particular cap end wall and the rib segments, thereby preventing propagation between adjoining cap members.

Figure 11:
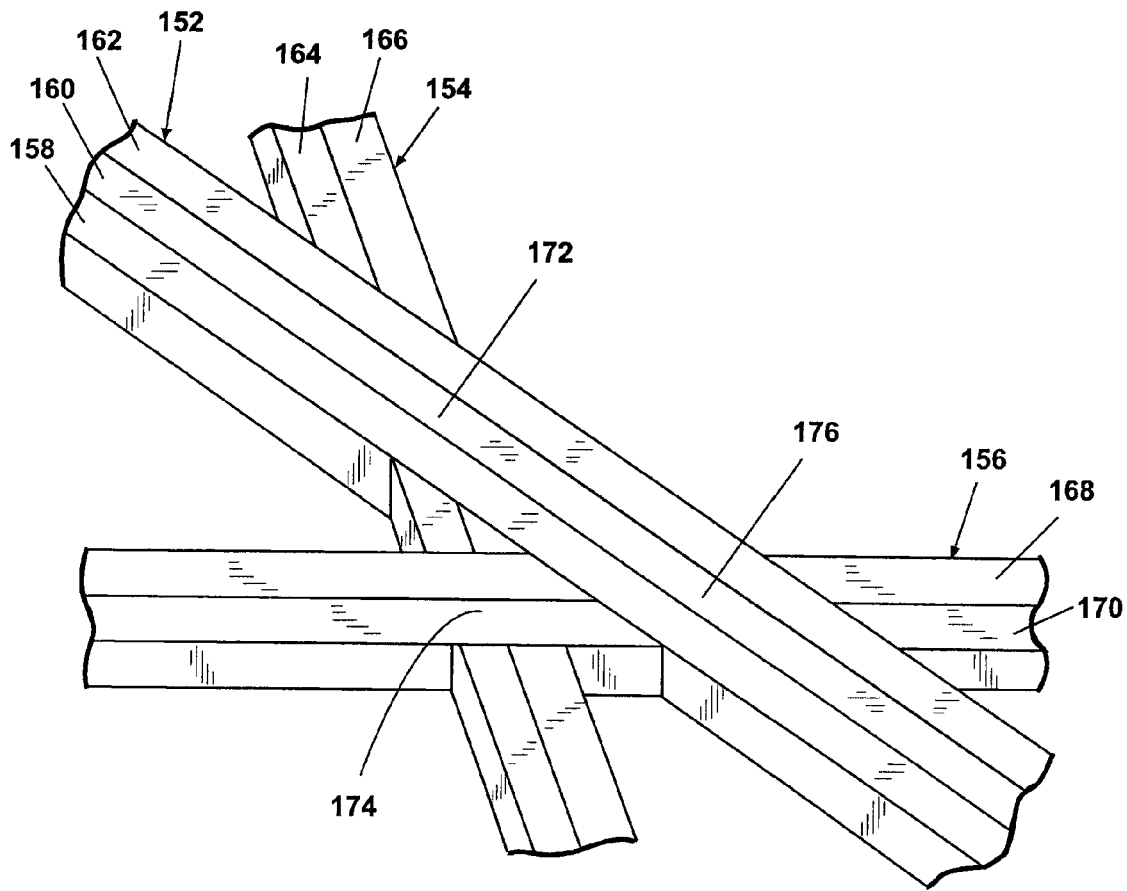
FIG. 11 is a perspective view of a non-cured grid.

Referring now to FIG. 11, exemplary intersections of the tows which subsequently form intersecting ribs 12 are shown prior to the curing process. First, second and third pre-formed ribs 152, 154 and 156 are angularly oriented with respect to each other. In this example, first pre-formed rib 152 includes first, second and third tows 158, 160 and 162. Second pre-formed rib 154 includes first and second tows 164 and 166. Third pre-formed rib 156 includes first and second tows 168 and 170. Each of the pre-formed ribs intersects only one of the other pre-formed ribs in an offset manner, creating exemplary intersections 172, 174 and 176. Intersections created in this offset manner maximize the strength of grid 11 and cellular composite structure 10. During cure, the tows of each of the pre-formed ribs are compressed to approximately half their non-cured width by expansion of tool(s) 68, which creates intersecting ribs 12 and intersections 172, 174 and 176 having approximately the same height.

Cellular composite structures according to the present invention provide several advantages. By providing separate cap members having multiple layers of material to create each of the associated riser walls bondable to intersecting ribs, structural integrity of the cellular composite structure is increased. When the cap members are thermally bonded to the intersecting ribs of the grid the close dimensional fit of the cap members ensures that the flow of resin leaves few or no gaps where a crack can initiate and propagate from. A hole or crack which initiates in any cap end wall is prevented from propagating to an adjacent cap member because of the multi-layer construction of the individual cap members and the individuality of each of the riser walls used to connect the cap members to the intersecting ribs. Similarly, if a crack forms between a riser wall and a rib of the present invention the crack is prevented from propagating beyond a riser wall/rib intersection location and thereby is prevented from propagating throughout the structure.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method for creating a cellular composite structure, the structure including a grid structure having a plurality of intersecting ribs, selected segments of the intersecting ribs creating a plurality of contiguous walls each defining one of a plurality of cavities, the method comprising:
    shaping a cap member having at least first and second layers of resin pre-impregnated cloth abutting together to define an end wall that lays within, and defines a perimeter, that substantially matches an inner perimeter of one of the contiguous walls;
    orienting a first freely extending portion of the first cloth layer perpendicular to a remainder of the first cloth layer, and orienting a second freely extending portion of the second cloth layer perpendicular to a remainder of the second cloth layer, and further such that said first and second cloth layers overlap one another only within an area defined by the inner perimeter of one of the contiguous walls;
    positioning the cap member within one of the cavities having each of the first and second freely extending portions in contact with different portions of the contiguous wall; and
    co-curing the cap member and the grid structure to bond the first and second freely extending portion of each of the first and second cloth layers to the different portions of the contiguous wall to create the cellular composite structure.

2. The method of claim 1, wherein the shaping step further comprises:
    preshaping an elastomeric tool to slidably fit within the cavity;
    applying the first and second cloth layers over an end face of the tool wherein the freely extending portion of each said cloth layer extends beyond a perimeter edge of the tool.

3. The method of claim 2, further comprising bending the first and second freely extending portions of the first and second cloth layers over spaced apart sides of the tool.

4. The method of claim 2, further comprising:
    maintaining contact between the tool and the cloth layers during the positioning operation; and
    removing the tool after the co-curing operation.

5. The method of claim 2, further comprising selecting a material of the tool having a coefficient of thermal expansion greater than a coefficient of thermal expansion of the resin pre-impregnated cloth of the cap member to permit the tool to expand during the co-curing operation to compress the first and second freely extending portions.

6. The method of claim 1, further comprising configuring the plurality of intersecting ribs to define a closed geometric shape of the cavities.

7. The method of claim 6, further comprising configuring the plurality of intersecting ribs such that the closed geometric shape is a triangle.

8. The method of claim 1, further comprising repeating the shaping, orienting, and positioning operations prior to the co-curing operation for each cavity of the grid structure.

9. A method for creating a cellular composite structure, the structure including a grid including a plurality of intersecting ribs, a plurality of rib intersections defining a plurality of rib segments, and a plurality of contiguous rib walls, the method comprising:
    orienting first ones of the ribs in a non-crossing pattern with respect to each other and angularly oriented with respect to second ones of the ribs such that segments of the first and second ones of the ribs create a plurality of contiguous rib walls defining a closed geometric shape such that individual ones of the plurality of the contiguous rib walls share selected ones of the rib intersections, with each of the contiguous walls defining one of a plurality of composite structure cavities;
    stacking at least first, second, and third layers of a resin pre-impregnated material to create individual ones of a plurality of cap members, the first, second, and third layers of each cap member together defining an end wall;
    forming a riser wall individually from each of the first, second, and third layers oriented perpendicular to the end wall, such that only a portion of the first layer that does not overlap the second and third layers is used to form a first section of the riser wall, and such that only a portion of the second layer that does not overlap the first and third layers is used to form a second section of the riser wall, the second section being spaced apart from the first section, and further such that only a portion of the third layer that does not overlap the first and second layers is used to form a third section of the riser wall, the third section being spaced apart from the first and second sections;

positioning individual ones of the plurality of cap members within selected ones of the plurality of cavities having each said riser wall in sliding contact with an individual one of the segments of one of the cavities; and co-curing the cap members and the plurality of intersecting ribs to adhesively bond the riser walls and the rib segments.

10. The method of claim 9, further comprising orienting the first ones of the ribs and the second ones of the ribs such that the closed geometric shape defines a parallelogram shape.

11. The method of claim 10, further comprising including a fourth layer of the resin pre-impregnated material during the stacking operation to create a parallelogram shaped end wall.

12. The method of claim 9, further comprising applying a unitary sheet of a resin pre-impregnated material over all of the cap members prior to the co-curing operation.

13. The method of claim 9, further comprising arranging the intersecting ribs in a plurality of rib groups prior to the orienting operation.

14. The method of claim 9, further comprising orienting a fiber orientation of any one of the at least first, second, and third layers angularly with respect to the other ones of the at least first, second, and third layers.

15. The method of claim 9, further comprising orienting the first ones of the ribs and the second ones of the ribs such that the closed geometric shape defines a triangular shape.

16. The method of claim 9, further comprising controlling a riser wall length for each said riser wall of the plurality of cap members so that said riser wall lengths are substantially matched to rib segment lengths of each of the rib segments.

17. The method of claim 9, further comprising shaping individual ones of the plurality of cap members to match a shape defined by a selected group of the rib segments and rib intersections.

18. The method of claim 9, further comprising selecting a material of the ribs as a graphite/polymeric material combination having multiple tows of fibers running parallel to one another in a direction of a rib length.

* * * * *